United States Patent [19]
Dupre et al.

[11] Patent Number: 5,630,633
[45] Date of Patent: May 20, 1997

[54] SHOVEL WITH DRIVEN TILTABLE BLADE

[76] Inventors: Herman K. Dupre, c/o Seven Springs, Champion, Pa. 15622; Charles Bihun, Jr., R.D. 1, Box 8B, Mill Run, Pa. 15454

[21] Appl. No.: 635,562

[22] Filed: Apr. 22, 1996

[51] Int. Cl.$^6$ ..................................................... A01B 1/22
[52] U.S. Cl. ............................................................ 294/53.5
[58] Field of Search ........................... 294/51, 53.5, 54.5, 294/55; 15/257.7; 37/241, 265, 285; 172/372, 381; 403/84, 91–94, 96, 103

[56] References Cited

U.S. PATENT DOCUMENTS

| | | | |
|---|---|---|---|
| 341,160 | 5/1886 | Myers | 294/53.5 |
| 529,562 | 11/1894 | Mortenson | 294/53.5 X |
| 1,162,845 | 12/1915 | Armstrong | 294/53.5 |
| 1,191,945 | 7/1916 | Carlson | 294/53.5 X |
| 1,261,859 | 4/1918 | Seiter | 294/53.5 |
| 1,478,204 | 12/1923 | Cooney et al. | 294/51 |
| 1,559,829 | 11/1925 | Wolfe | 294/53.5 |
| 1,570,189 | 1/1926 | Sturm | 294/53.5 X |
| 1,741,004 | 12/1929 | Wornstaff | 294/53.5 |
| 1,810,026 | 6/1931 | Moller | 294/53.5 |
| 2,098,609 | 11/1937 | Bishop . | |
| 3,154,336 | 10/1964 | Nelson | 294/54.5 |
| 3,248,811 | 5/1966 | Pravednekow . | |
| 3,473,838 | 10/1969 | Rankin | 294/53.5 |
| 4,180,289 | 12/1979 | Faine | 294/53.5 |
| 5,228,734 | 7/1993 | Pollastro | 294/54.5 |
| 5,290,013 | 3/1994 | Dearman | 294/53.5 X |

FOREIGN PATENT DOCUMENTS

| | | | |
|---|---|---|---|
| 601760 | 8/1934 | Germany | 294/51 |
| 668282 | 11/1938 | Germany | 294/53.5 |
| 59259 | 4/1938 | Norway | 294/53.5 |
| 109977 | 3/1944 | Sweden | 294/53.5 |

*Primary Examiner*—Johnny D. Cherry
*Attorney, Agent, or Firm*—Carothers & Carothers

[57] ABSTRACT

A shovel having a blade and a handle pivotally mounted on the back of the blade with a mechanism for pivotally retaining the handle at various angles relative to the blade between an open and a closed position. A releasable locking mechanism is operable for releasing and relocking the blade relative to the handle at different relative angles between the open and closed positions. A spring bias drive is connected between the blade and the handle and is adapted for pivoting the blade under bias relative to the handle from the open position towards the closed position when the releasable locking mechanism is actuated or released.

7 Claims, 2 Drawing Sheets

SHOVEL WITH DRIVEN TILTABLE BLADE

BACKGROUND OF THE INVENTION

This invention generally relates to improvements in shovels and more particularly to shovels with adjustable handles.

The common snow shovel has been in use for many years, but has deficiencies in that it requires strenuous lifting, is not effective for slide transfer of snow loads and is not effective for removable of other debris, such as mud or liquids, leaves, surface dirt, sand or light aggregate.

SUMMARY OF THE INVENTION

The shovel of the present invention is provided with a blade and a handle pivotally mounted to the back of the blade with a mechanism for pivotally retaining the handle at various angles relative to the blade between an open position and a closed position. A releasible locking mechanism is operable to release and relock the blade relative to the handle at different relative angles between the open and close positions. A spring bias drive is connected between the blade and the handle and is adapted for pivoting the blade automatically under bias relative to the handle from the open position towards the closed position when the releasible locking mechanism is actuated or released.

Adjustable stops are preferably provided for adjusting the limits of maximum pivotal extension for the handle between the open and closed position.

This drive for tilting the blade back upon actuation of the releasible locking mechanism consists, in its simplest form, of nothing more than a stretch spring.

The releasible locking mechanism may be actuated or released and reengaged to automatically tilt the blade backwards and to thereafter stop it at the desired angular position between the open and closed position.

The releasible locking mechanism may be readily constructed by providing a rearwardly projecting notched quadrant secured to the back of the blade. An actuating rod is slidably secured to the handle and a right angular projection is provided at the lower end of this rod for selective engagement with the notches of the quadrant. A spring is connected for urging the projection into engagement with a selected notch.

Thus when one wishes to disengage or release the releasable locking mechanism, the rod is slid up the handle to disengage the right angular projection from its engaged quadrant notch. As soon as this is done, the drive spring urges the blade to tilt backward from its open position and drives the blade so that it tilts automatically backward or upward to thereby hold and retain its contents in similar fashion to a scoop.

This releasable locking mechanism further preferably also includes a trigger that is pivotally secured to the handle and also pivotally secured to the upper end of the actuating rod. This trigger is positioned on the handle for hand engagement in order to disengage the projection from one of the quadrant notches and to thereby tilt the blade back under the applied bias of the drive or drive spring.

The blade is preferably provided with sides in order to have the capability of holding liquid loads, such as flood water and mud. This blade may be advantageously constructed of cut-out portions of used plastic drums, such as plastic drums which were once filled with liquid or powdered soap or detergent.

The shove of the present invention can accordingly be readily used to scoop and remove many different types of debris, such as leaves, surface dirt, sand, light aggregate, and even liquid loads, such as water or mud. For example, the shovel of the present invention can be readily used for scraping mud from flood damaged carpets and floors. In addition, the shovel of the present invention is adapted to scoop up and retain large loads of such debris, not heretofore possible with prior art shovels.

The shovel of the present invention is operated by first positioning the blade in its open position for pushing and scraping a surface and thereby building up the debris in the shovel blade or scoop. As the operator is moving the shovel forward and thereby filling up the blade with debris, the trigger mechanism is actuated near the end of the shoveling stroke to cause the blade to quickly rotate backward or upwards to thereby scoop up and maintain a maximum shovel load within the blade. Sides are provided on the blade to maintain maximum loads and wet loads and water within the blade.

With the release of a locking mechanism, it may be reengaged to relock the blade relative to the handle at any desired relative angle of rotation between the handle and the blade between the open and closed positions.

The shovel of the present invention permits different angles of attack for the blade when shoveling, permits last minute driven scoop up actuation of the blade to hold and retain a maximum load and also permits the full shovel to thus be utilized as a carrier to slide the contained debris to a desired location for dumping. When the dumping area is reached, the shovel is simply tilted up to release the load and the blade is recocked to its open position by releasing the locking mechanism and forcing the blade back to its open position and then reengaging the locking mechanism. In this manner, lifting of the heavy load in the shovel blade is completely eliminated, and maximum loads are obtainable and contained in the blade.

BRIEF DESCRIPTION OF THE DRAWINGS

Other objects and advantages appear in the following description and claims. The accompanying drawings show, for the purpose of exemplification, without limiting the invention or the claims thereto, certain practical embodiments illustrating the principals of this invention wherein:

DETAILED DESCRIPTION OF A PREFERRED EMBODIMENT

Figure 1:
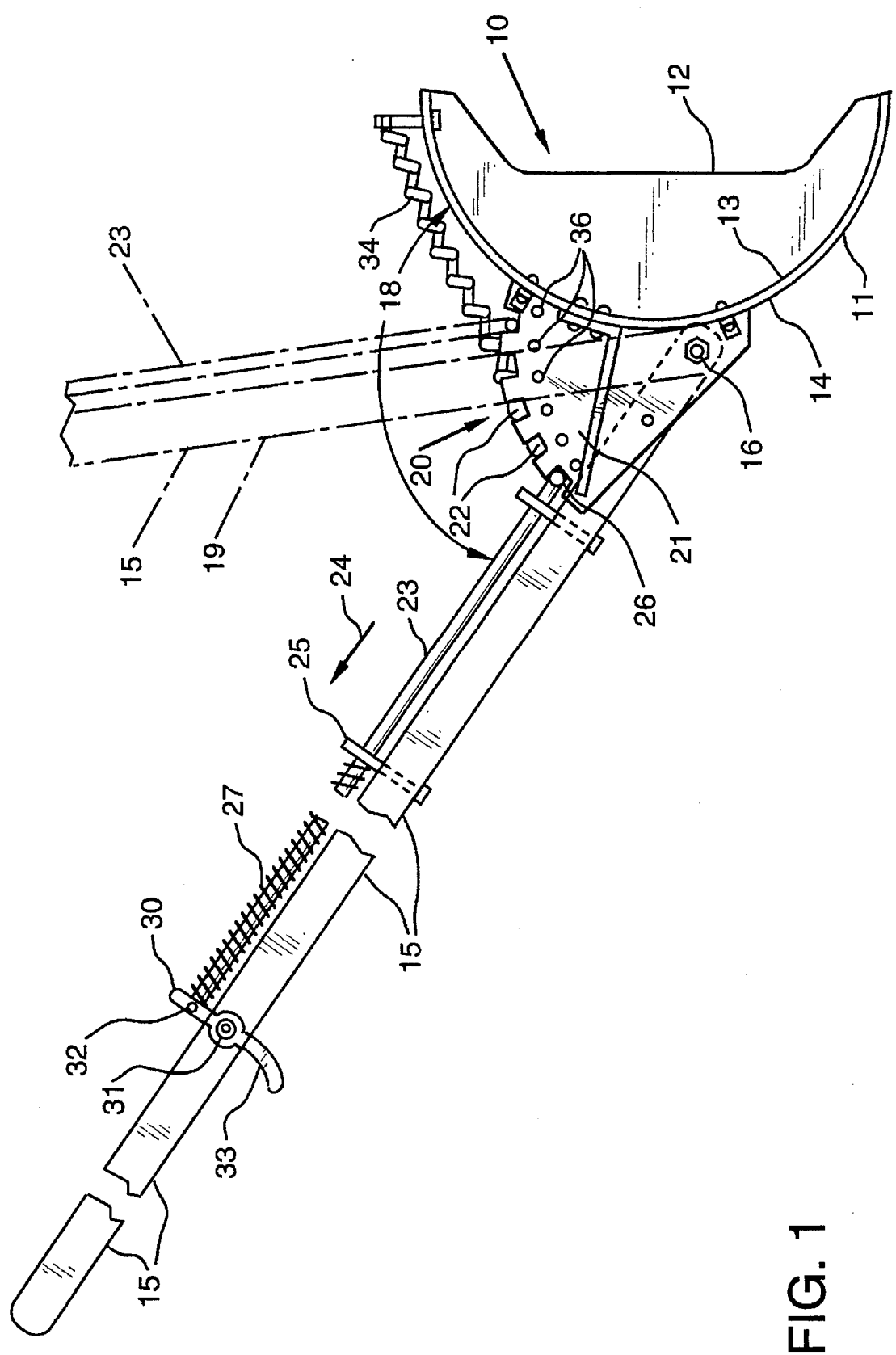
FIG. 1 is a view in side elevation of a shovel incorporating the principals of the present invention.
Figure 2:
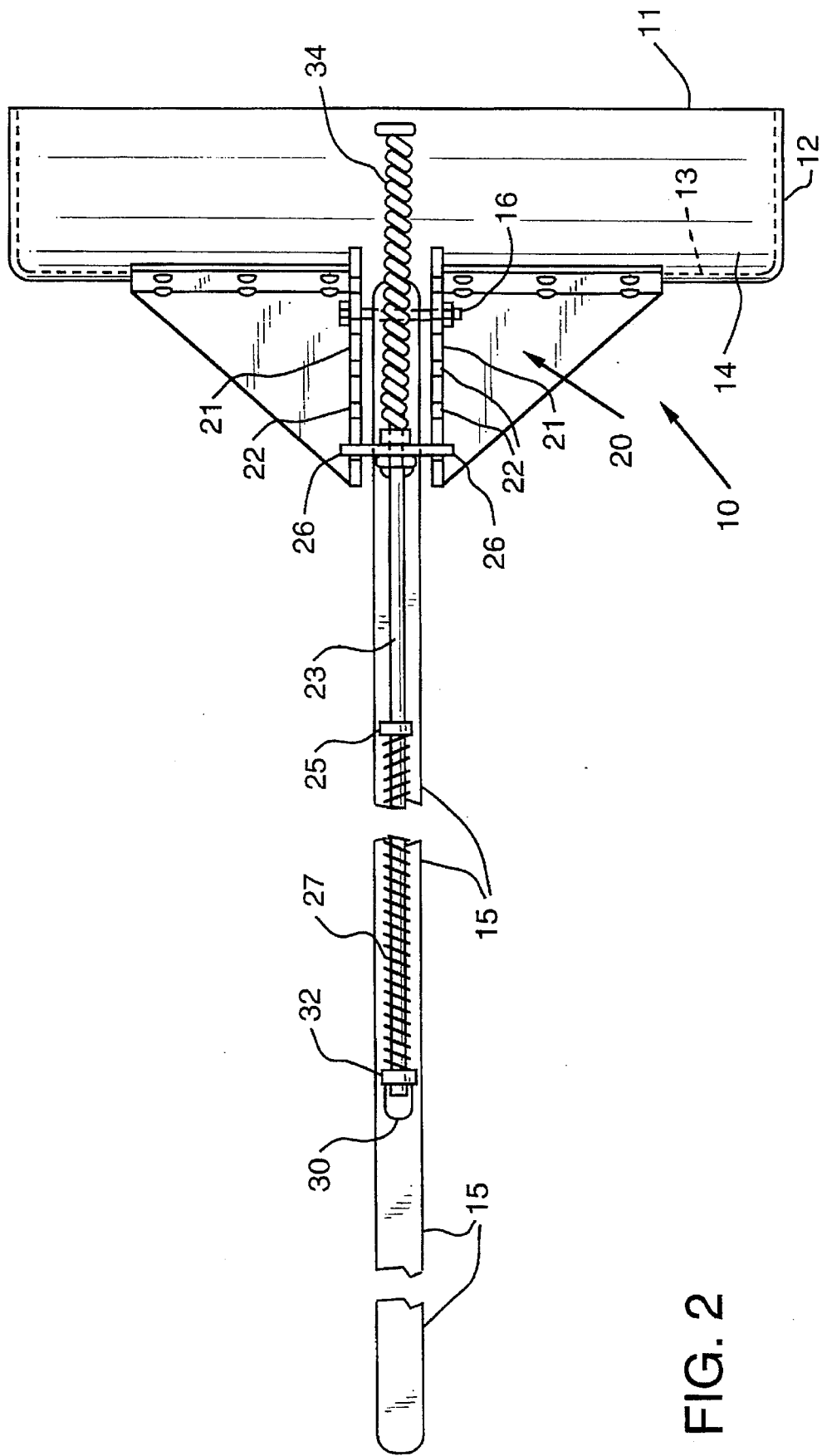
FIG. 2 is a top or plan view of the shovel shown in FIG. 1.

Referring to the drawings, the shovel 10 of the present invention includes a shovel blade 11 having sides 12, the blade 11 having a front 13 and a back 14. A handle 15 is pivotally retained at pivot 16. Releasable locking mechanism 20 pivotally retains handle 15 at various angles between the open position shown at 18 and the closed position 19 (illustrated in dashed outline).

Releasable locking mechanism 20 is operable for releasing and relocking blade 11 relative to handle 15 at different relative angles between open and closed positions 18 and 19.

Releasable locking mechanism 20 includes a rearwardly projecting notched double sided quadrant 21 secured to the back 14 of blade 11. Quadrant 21 is provided with a respective series of circumferential notches 22.

A locking rod 23 is slidably secured to handle 15 and may be slid upwardly as indicated by arrow 24 through slide back bracket 25 secured to handle 15.

A right angle projection 26 is provided on the lower end of rod 23 for selective engagement with the notches 22. In addition, a stretch spring 27 is connected in tension between trigger 30 and side 25 to continually urge right angle projection 26 into engagement with a respective notch 22 of quadrant 21.

Trigger 30 is pivotally secured to handle 15 at pivot 31 and it is also pivotally secured to the upper end of rod 23 as indicated at 32.

Trigger handle 33 is conveniently exposed so that one holding handle 15 may readily slide his hand down the handle and engage trigger 30 at handle 33 and thereby rotate the trigger 30 counterclockwise to disengage right angle projection 26 from one of the notches 22. This permits blade 11 to tilt back under the applied bias of stretch drive spring 34, which is connected between blade 11 and handle 15.

Accordingly spring biased drive 34 is adapted for pivoting blade 11 under bias relative to handle 15 from open position 18 to closed position 19. In fact, releasable locking mechanism 20 may be reengaged to stop the rearward or upward tilting of blade 11 at any desired position provided between open position 18 and closed position 19. This is accomplished by quickly releasing trigger handle 33 so that lateral projection 26 will again under the bias of compression spring 27 quickly engage into a next notch 22 provided in quadrant 21.

The limit for maximum pivotal extension between the full open position 18 and the full closed position 19 shown in FIG. 1, may be adjusted by utilizing stops 36. Stops 36 consist of horizontal retaining pins which may be slid through the respective aligned stop passages 36 in the double side walls of quadrant 21. By inserting such stop pins at the appropriate position, the angle of angular rotation of handle 15 relative to blade 11 can be limited within the full range of open position 18 and closed position 19.

The blade 11 is preferably constructed from used plastic drums, such as the plastic drums utilized to ship and contain liquid or powdered detergents or soaps. Each such used drum can be readily cut open to provide two appropriate scooping blades 11 with sides 12.

The sides 12 permit the blade 11 to contain liquid loads and in general larger loads.

In operation, the shovel 10 is used in conventional fashion. It is first used in its full open position 18 to scrape debris from a ground surface into the interior of blade 11. As the operator approaches the end of his sliding or scraping stroke and has a full scoop or blade 11, he quickly engages the trigger handle 33, while maintaining handle 15 in the same position relative to the ground surface being scraped. Blade 11 under the bias of stretched spring 34 then quickly tilts backward to thereby scoop up and retain a maximum load within blade 11 as the operator finishes up his pushing stroke of the shovel.

The blade then contains a full load and the shovel may be pulled away and thereby operated as a carrier for the debris to a dumping location. At the dumping location the handle is tilted upward and the debris dumped out of blade 11.

The operator then engages trigger handle 33 again and pushes the blade with his foot back to full open position 18 and reengages the locking mechanism 20 by releasing trigger handle 33. The shovel is then ready for additional use.

When the blade 11 is in its upward or tilted back position for carrying a load, the load within blade 11 is easily slid to any dumping location as the bottom lower portion of the back 14 of blade 11 rides on the underlying surface. Accordingly, the shovel when full and operating as a carrier can be just as easily pushed forward to a dumping location as well as being dragged backward.

We claim:

1. A shovel comprising: a shovel blade having a front and a back, a handle pivotally mounted on the back of said blade with a mechanism for pivotally retaining the handle at various angles relative to said blade between an open position and a closed position, and a releasable locking mechanism operable for releasing and relocking said blade relative to said handle at different relative angles between said open and closed positions, the improvement comprising a spring biased drive connected between said blade and said handle and for pivoting said blade under bias relative to said handle from said open position toward said closed position when said releasable locking mechanism is released.

2. The shovel of claim 1, including adjustable stops positioned for adjusting limits of maximum pivotal extension for said handle between said open and closed positions.

3. The shovel of claim 2 wherein said drive includes a stretch spring.

4. The shovel of claim 3, said releasable locking mechanism including a rearwardly projecting notched quadrant secured to the back of said blade and providing a series of notches, an actuating rod slidably secured to said handle and a right angular projection on a lower end of said rod for selective engagement with said notches, and a spring connected for urging said projection into engagement with a selected notch.

5. The shovel of claim 4, said releasable locking mechanism further including a trigger pivotally secured to said handle and also pivotally secured to an upper end of said rod for hand engagement of said trigger to disengage said projection from one of said notches and thereby tilt said blade back under applied bias of said drive.

6. The shovel of claim 1 wherein said blade includes sides.

7. The shovel of claim 6 wherein said blade is a cut-out portion of a used plastic drum.

\* \* \* \* \*